United States Patent [19]

Mickle et al.

[11] Patent Number: 4,610,172
[45] Date of Patent: Sep. 9, 1986

[54] INDUCTION FEEDBACK STABILIZED SUSPENSION GYROSCOPE

[75] Inventors: Marlin H. Mickle; Yuly M. Pulyer, both of Pittsburgh, Pa.

[73] Assignee: University of Pittsburgh, Pittsburgh, Pa.

[21] Appl. No.: 439,038

[22] Filed: Nov. 4, 1982

[51] Int. Cl.[4] .................. G01C 19/08; G01C 19/24; G01C 19/28; G01C 19/30
[52] U.S. Cl. .................... 74/5.46; 74/5.6 A; 74/5.6 D; 74/5.6 E; 74/5.7; 250/231 GY
[58] Field of Search ............ 74/5.46, 5.47, 5.6 A, 74/5.6 D, 5.6 E, 5.8, 5.7; 308/10; 250/231 GY

[56] References Cited

U.S. PATENT DOCUMENTS

| | | | |
|---|---|---|---|
| 1,589,039 | 1/1926 | Anschutz-Kaempfe | 74/5.46 X |
| 2,510,968 | 6/1950 | Fowler | 74/5.46 |
| 2,798,995 | 7/1957 | McLean | 318/254 |
| 2,900,825 | 8/1959 | Echolds et al. | 74/5.46 |
| 3,097,535 | 7/1963 | Bert | 74/5.7 |
| 3,347,105 | 10/1967 | Polushkin et al. | 74/5.6 |
| 3,416,378 | 12/1968 | Evans et al. | 74/5.6 |
| 3,452,609 | 7/1969 | Goodhue et al. | 74/5.6 |
| 3,475,971 | 11/1969 | Binder et al. | 74/5.6 |
| 3,479,889 | 11/1969 | Binder et al. | 74/5.6 |
| 3,670,585 | 6/1972 | Alexander et al. | 74/5.6 |
| 3,732,739 | 5/1973 | Catford et al. | 74/5.6 |
| 3,741,020 | 6/1973 | Hurlburt | 74/5.46 |
| 3,787,100 | 1/1974 | Habermann et al. | 308/10 |
| 3,813,949 | 6/1974 | Rodgers | 74/5.6 A |
| 3,824,865 | 7/1974 | Evans et al. | 74/5.6 D |
| 3,902,374 | 9/1975 | Hoffman et al. | 74/5.6 D |
| 3,915,019 | 10/1975 | Zoltan | 74/5.6 A |
| 4,036,453 | 7/1977 | Evans et al. | 244/3.16 |
| 4,061,043 | 12/1977 | Stiles | 74/5.8 X |
| 4,095,477 | 6/1978 | Morris et al. | 74/5.6 D |
| 4,121,143 | 10/1978 | Habermann et al. | 318/629 |
| 4,155,521 | 5/1979 | Evans et al. | 244/3.16 |
| 4,167,296 | 9/1979 | Dendy | 308/10 |
| 4,189,948 | 2/1980 | Buckley et al. | 74/5.46 |
| 4,211,452 | 7/1980 | Poubeau | 74/5.46 X |
| 4,240,302 | 12/1980 | Karnick | 74/5.46 |
| 4,285,552 | 8/1981 | Sutter | 308/10 |
| 4,441,375 | 4/1984 | Mindhara et al. | 74/5.46 |

FOREIGN PATENT DOCUMENTS 0063116  5/1981  Japan ..................... 308/10

Primary Examiner—Rodney H. Bonck
Attorney, Agent, or Firm—Arnold B. Silverman

[57] ABSTRACT

A suspension gyroscope has a stator and a rotor rotatably mounted with respect to the stator. The rotor has at least one generally hemispherical portion which is, at least in part, electrically conductive. The rotor may also have disc-like portions which project radially outwardly therefrom. Electrical coils serve to generate magnetic fields which induce eddy currents in the hemispherical portions and the disc-like portions. These coils serve to monitor the positions of the rotors with respect to three reference axes. A sensor for measuring departure of the rotor from a desired position is provided and may be optical or magnetic in nature.

27 Claims, 14 Drawing Figures

INDUCTION FEEDBACK STABILIZED SUSPENSION GYROSCOPE

BACKGROUND OF THE INVENTION

1. Field of the Invention

This invention relates to induction feedback stabilized suspension gyroscopes and, more specifically, gyroscopes which are adapted to provide predetermined indications of departure from desired position.

2. Description of the Prior Art

Gyroscopes have been used for guidance, navigation and control of aircrafts, satellites, ships, submarines and missiles, for example. Unique mechanical properties make the gyroscope very effective in such uses, as well as others.

Various forms of gyroscope construction have been known previously. See, for example U.S Pat. Nos. 2,798,995; 3,347,105; 3,416,378; 3,741,020; 3,787,100; 4,095,477; 4,121,143; 4,167,296; and 4,189,948.

It has also been known in certain types of gyroscopes to provide spherical or hemispherical elements. See U.S. Pat. Nos. 3,097,535; 3,670,585; 3,824,865 and 4,036,453.

It has also been known to employ various noncontacting means of obtaining information regarding the position or other operating characteristics of a gyroscope. See U.S. Pat. Nos. 3,452,609 and 3,475,971. U.S. Pat. No. 3,479,889 discloses magnetic means for obtaining such information. Optical means are disclosed in U.S. Pat. Nos. 3,732,739; 3,813,949; 3,824,865; 3,915,019 and 4,155,521.

In spite of these prior disclosures as well as others, there remains a need in this enviroment for an economical and effective means for providing an accurate determination of position of a gyroscope rotor and an indication as to the angle and magnitude of deviations when deviations occur.

SUMMARY OF THE INVENTION

The present invention has met the above described need and has provided a number of improvements over the prior art. The present invention provides a suspension gyroscope which has a stator and a rotor rotatably mounted on the stator. Means are provided for initiating rotation and levitation of the rotor with respect to the stator. The rotor has a pair of generally hemispherical portions at least portions of which are electrically conductive. First electrical coil means are provided for generating magnetic fields to induce eddy currents in the hemispherical portions. The first electrical coil means have coils adapted to apply a levitating force to a first hemispherical portion and coils adapted to apply a lifting force to the other hemispherical portion to correct the position of the rotor in the levitated state in a first direction. The rotor has disc means which are at least partially electrically conductive. Second electrical coil means are provided for inducing eddy currents in the disc means in order to control positioning of the rotor in second and third directions. Sensor means are provided for sensing departure of the rotor from a desired position with respect to the stator.

In preferred embodiments of the invention the sensor means employ either optical pickoff means or magnetic pickoff means.

It is an object of the present invention to provide an induction feedback stabilized suspension gyroscope which functions with effective power consumption and low heat generation in generating a levitation force.

It is a further object of the invention to provide such a gyroscope which is easy to manufacture and adapted to permit precise adjustment.

It is an object of this invention to provide a means of levitation, sensing and control so as to be able to maintain the center of spin mass at the center of the magnetic field.

It is another object of the invention to provide a spherical induction system and position stabilization device in a system which permits precise position determination in respect of six degrees of freedom.

It is a further object of the invention to provide such a gyroscope which employs a vertically magnetically levitated gyroscope rotor with a control signal being emitted when a deviation from desired position occurs.

It is yet another object of this invention to provide such a gyroscope which is adapted to give a digital readout related to the gyroscope rotor position.

These and other objects of this invention will be more fully understood from the following description of the invention on reference to the illustrations appended hereto.

BRIEF DESCRIPTIONS OF THE DRAWINGS

DESCRIPTION OF THE PREFERRED EMBODIMENTS

As used herein, the term "hemispherical" shall mean a hollow article having a generally hemispherically shape and shall generally include articles which are less than or more than precisely one half of a sphere and shall include shapes which closely approximate the configuration of a sphere or portion thereof including but not limited to parabolic or any other shape which will provide levitation vector stability with respect to precession angle which is limited to vertical position sensors.

Figure 1:
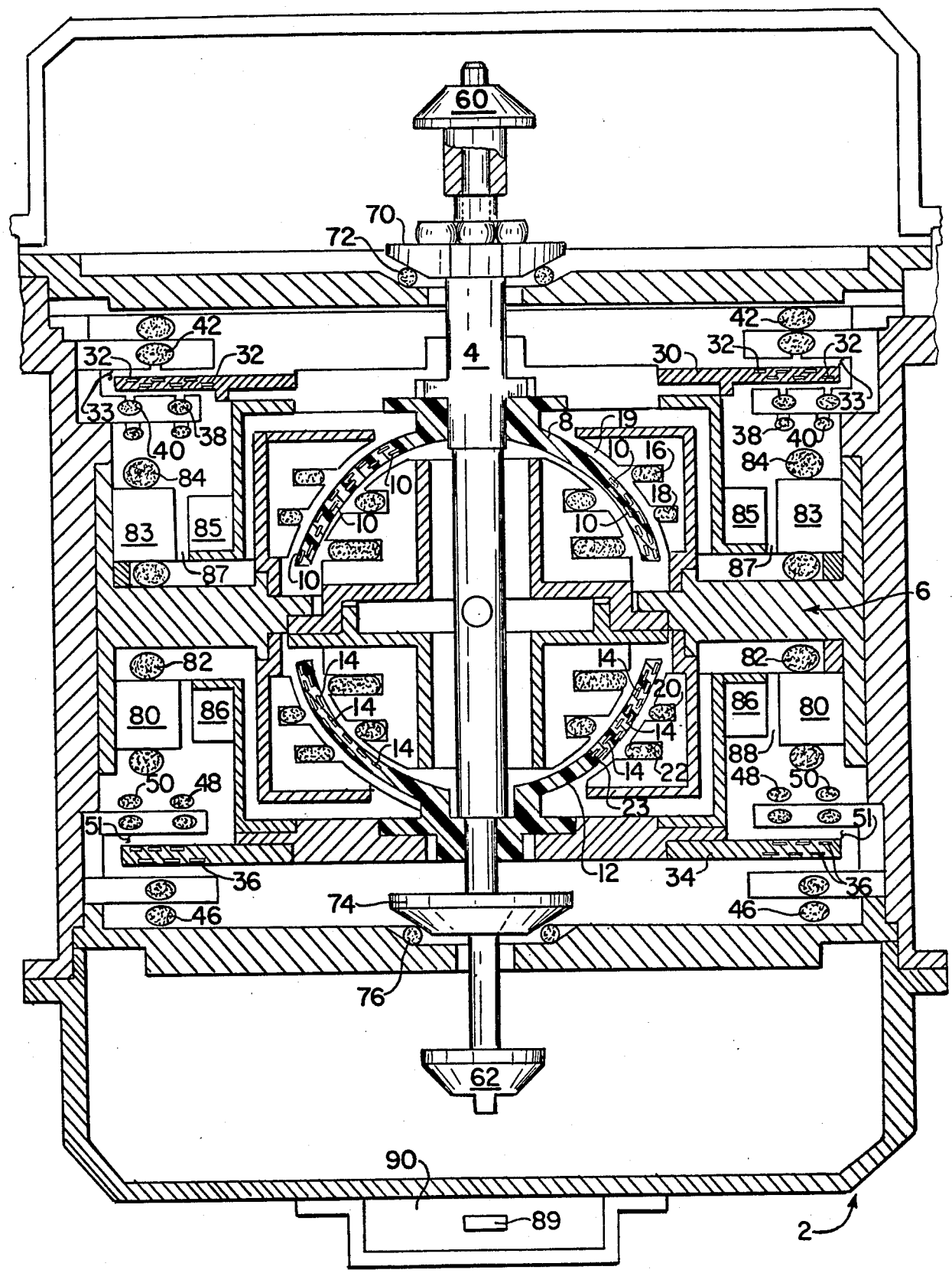
FIG. 1 is a partially schematic, sectional view of a form of gyroscope of the present invention.

Referring now more specifically to FIG. 1, there is shown an embodiment of the gyroscope of the present invention. A housing 2, which may advantageously be made of metal, contains a rotor 4 which is mounted for axial rotation and a cooperating stator 6. Hemisphere 8 is fixedly secured to rotor 4 for rotation therewith and is preferably made from a nonmagnetic, nonmetallic material which is electrically nonconductive. Hemisphere 8 is preferably annularly substantially continuous and contains a plurality of electrically conductive bands 10 which are also annular and are secured to and embedded within the hemisphere 8. Similarly, hemisphere 12 which is also fixedly secured to rotor 4 has its concave opening facing the concave opening of hemisphere 8. It is also preferably composed of a nonmagnetic, nonmetallic electrically nonconductive material and has a plurality of annular bands of conductive band 14 secured to or embedded within hemisphere 12. The conductive materials 12, 14 preferably have a thickness of about 0.1 to 0.5 mm. These conductive materials 10, 14 may be on either the inside surface, the outside surface or both in conjunction with thermostable plastic material. Such arrangements may be created by multilayer printed circuit technology.

Coils 16 and 18 which are secured within the stator are adapted to be electrically energized and have their magnetic fields induce eddy currents in conductors 10 thereby applying a levitation force tending to lift hemisphere 8 and thereby lift rotor 4 with the degree of lifting depending upon the number of wraps in the coil, the extent of air gap 19 and the amount of current passing through coils 16, 18. Stator coils 20, 22 also are secured within the stator 6 in a member of generally complimentary shape with respect to hemisphere 12 and spaced therefrom by air gap 23. These coils 20, 22 when energized will induce eddy currents in conductors 14 thereby creating a lifting force on the hemisphere 12 and on rotor 4 in a generally axial direction with respect to rotor 4. For convenience of reference herein this direction will be referred to the Z direction. If desired, the coils 16, 18 may be employed to maintain magnetic levitation of rotor 4 and coils 20, 22 may be employed to effect corrections to the desired position of the rotor 4.

Secured to the rotor in fixed fashion for rotation therewith are a pair of disc members 30, 34. In the form shown the discs are spaced generally radially outwardly of the two hemispheres 8, 12. Disc 30 is provided with a plurality of annular conductor members 32 which are secured to or are embedded within the disc 30 and disc 34 is provided with a plurality of any electrically conductive members 36 which are secured to or embedded in disc 34. In the form illustrated each of the discs has a series of three coils in spaced relationship from its conductors 32, 36 at a number of circumferential locations. In general it will be preferred to have about 10 to 50 series of coils per conductive disc. Disc 30 has coils 38, 40, 42 positioned in spaced relationship with respect to conductive elements 32 by an air gap 33. Similarly, disc 34 has coils 46, 48, 50 spaced from conductive elements 36 by air gap 51. When the coils 38, 40, 42, 46, 48, 50 are electrically energized, the magnetic field which they create induces currents in their respective conductors 32, 36 thereby applying a force to the discs 30, 34 so as to move the rotor 4 in the X or Y directions (perpendicular to each other and to the Z direction) in respect to rotor axis 4 which is an easy direction. This permits correction of position in these directions.

It will be appreciated that as this system permits correction in an either positive or negative direction with respect to the X, Y and Z axes, the gyroscope of the present invention may have its position corrected with respect to six degrees of freedom.

Referring still to FIG. 1, it will be noted that, in the form shown, at each free end of rotor 4 is a sensor 60, 62 which in a fashion to be described hereinafter serves to communicate information from the rotor to an electronic processing system so as to permit digital determination of the position of the rotor and the extent to which deviation from a desired position has occurred. A pair of collar members 70, 74 are each secured to the rotor 4 at positions axially outward of the discs 30, 34. Each of these collars 70, 74 is supported by ballbearings 72, 76, respectively, when the rotor is permitted to return to a resting position under the influence of gravity. In initiating operation of the gyroscope, in the form shown, a pair of gyroscopic motors 80, 83 having respectively motor coils 82, 84, are energized so that the magnetic field generated will induce currents and apply a force to rotor sectors 85, 86 which are separated from the motors by air gaps 87, 88 so as to initiate rotation and levitation of rotor 4. This causes the rotor to move in an axially upward direction. After this has been accomplished, the coils 16, 18 may be energized to assume the burden of maintaining levitation by magnetic means and the other coils may be employed to provide information and, where appropriate, take corrective action in respect of the positioning of rotor 4.

In start up, the rotation reaches a desired velocity, at which time the power to these motors 80, 83 is cut off. Under levitation, a minimum of energy lost provides a period of time during which the velocity remains above a minimum $w_m$. When the velocity (sensored by optical or magnetic transducer) drops below $w_m$, the motors 80, 83 are turned on. The control of the rotation motors is thus an on-off control.

A further feature shown in FIG. 1 is transducer 89 which is positioned within recess 90 and may be employed in order to obtain an initial determination that the rotor is in its desired position with respect to gravity.

Figure 2:
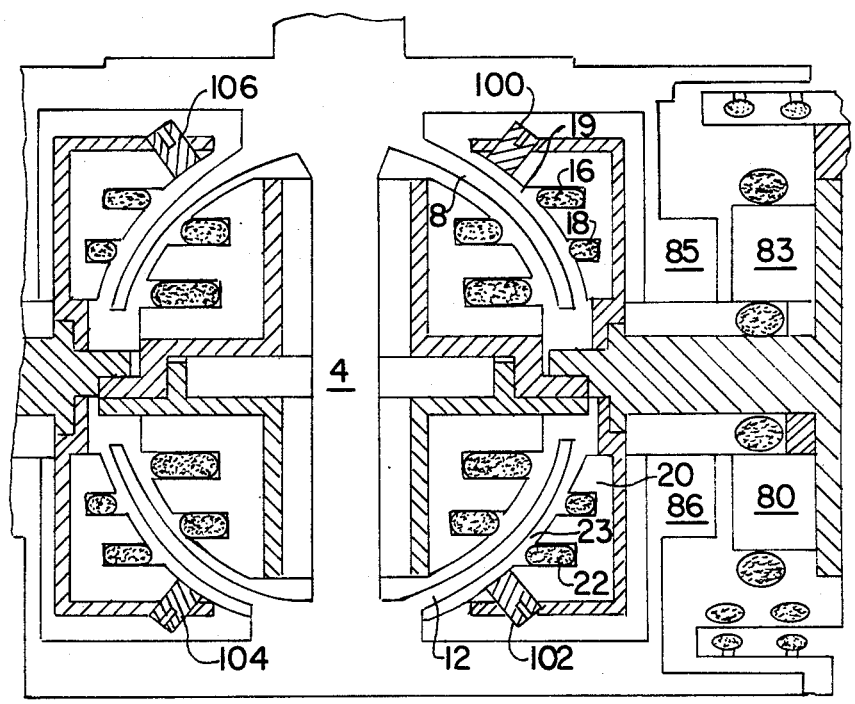
FIG. 2 is a partial, cross-sectional view of the gyroscope of FIG. 1 showing the fine tuning feature.

Referring to FIG. 2, a further feature of the invention which may be employed to increase control will be considered. In this embodiment, a series of set screws 100, 102, 104, 106 are secured to the stator and are adapted by adjustment by a screw mechanism to move permanent magnets either closer to or farther away from the adjacent hemispheres 8, 12 so as to reduce or increase the amount of force applied through induced currents in the conductors which are secured to the hemispheres 8, 12. A magnetic fine trim adjustment composed of magnetic screws as necessary for the particular gyro configuration may be used for alignments. Additional screws may be added if desired to facilitate the desired alignment.

Figure 3:
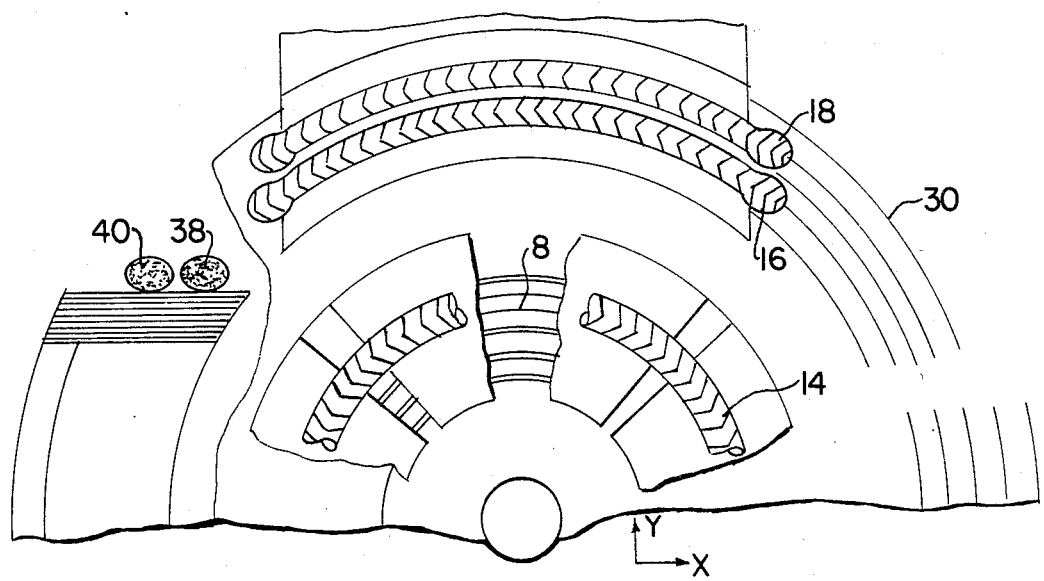
FIG. 3 is a partial, cross-sectional view illustrating, generally in plan, a section of the gyroscope of FIG. 1.

Referring now to FIG. 3 there is shown the X-Y reference axes and portions of the disc 30 and upper hemisphere 8. Additionally shown are portions of the circular coil 16, 18 and a portion of the magnetic band 14.

Figure 4:
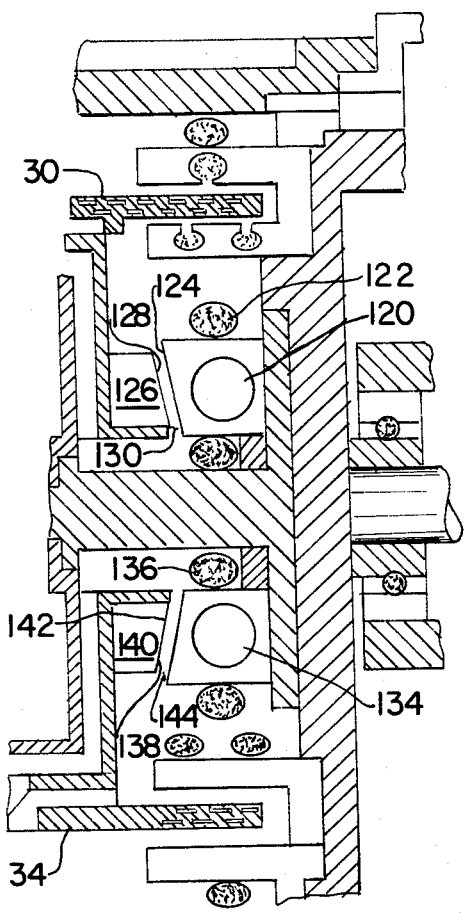
FIG. 4 is a elevational cross-sectional view showing a modified form of starting motor of the present invention.

Referring to FIG. 4, a modification to the structure of the gyroscope motors 80, 83 and the associated motor sectors 85, 86 will be considered. In FIG. 1 the faces of these elements cooperating to define the air gaps 87, 88 were generally cylindrical, and in general, the rotor 4 will be vertically oriented and will, under the influence of gravity, drop when the electrical coils are deenergized. By custom contouring the surfaces defining the air gaps, increased support for the rotor may be obtained in addition to or in lieu of the use of collars 70, 74 and their associated ballbearings 72, 76. In the form shown in FIG. 4, the upper gyroscope motor 120 has coil 122 and an angularly oriented face 124 which cooperates with rotors sector 126 which has angularly oriented surface 128 which cooperates with surface 124 to define angularly disposed air gap 130. Similarly, motor 134 has coil 136 and surface 138 which cooperates with rotor sector 140 which has inclined surface 142 to define sloping air gap 144. It will be appreciated that the upper motor 120 and the rotor sector 126 will tend to limit the degree of upward movement of the rotor, while the lower motor 134 and the associated rotor sector 140 will limit the degree of downward movement.

Figure 5:
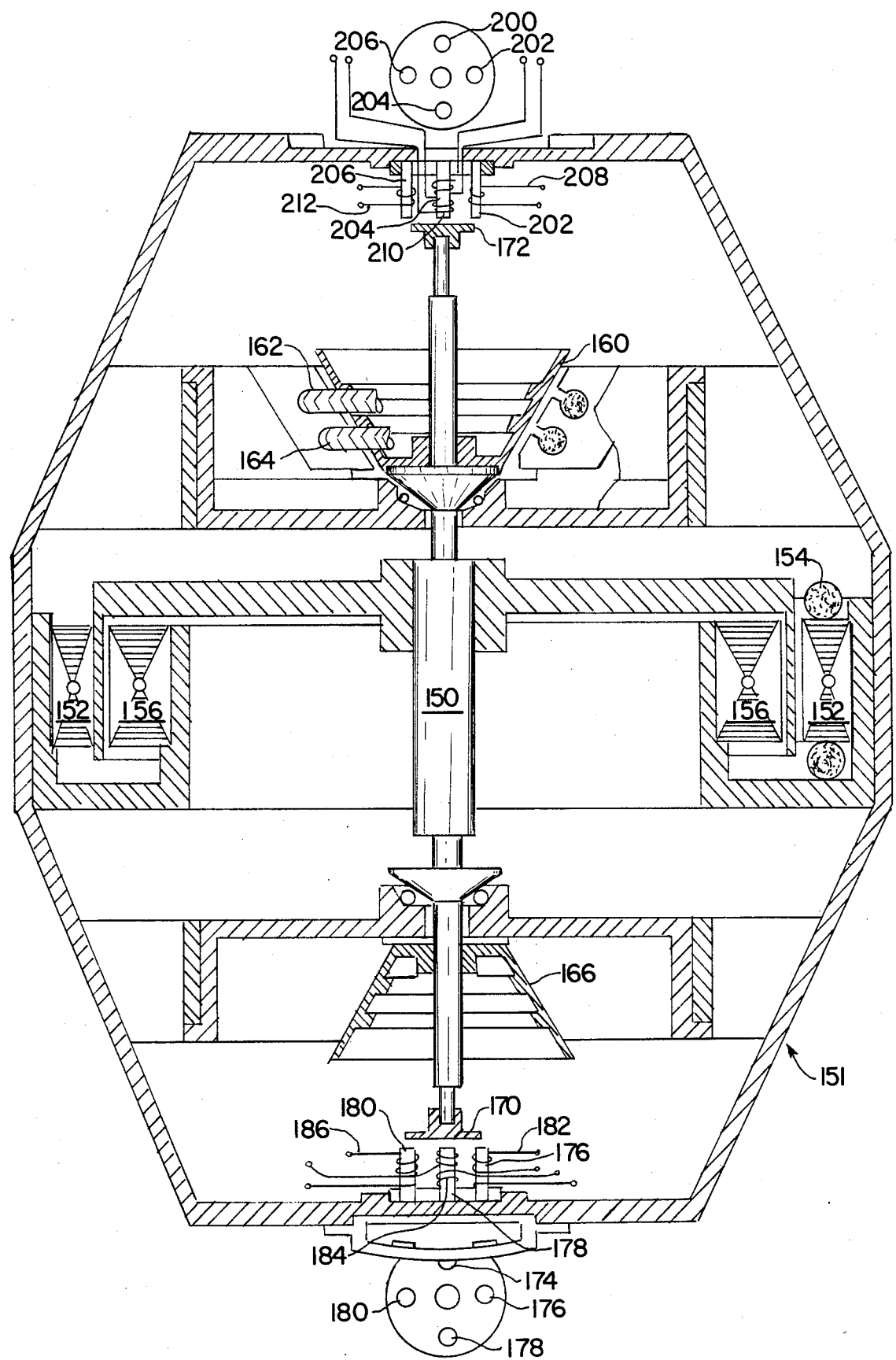
FIG. 5 is a partial, cross-sectional view showing a modified form of rotor.

Referring now to FIG. 5, there is shown a modification of the invention and more details regarding a form of magnetic pickoff employable with the present invention. Rotor 150 is mounted for rotational movement within housing 151 and has a pair of hemispheres 160, 166 fixedly secured to the rotor 150. Each hemisphere 160, 166 has a plurality of conductive rings (not shown). Coils 162, 164 are secured to the stator and are positioned in spaced relationship with respect to hemisphere 160. Similar coils (not shown) are employed with hemisphere 166. A single gyroscope motor 152 having motor coil 154 cooperates with rotor section 156 to apply the initial rotational and levitational forces.

As is shown in FIG. 5, secured in spaced underlying relationship with respect to sensor 170 which is secured to one end of rotor 150 are a series of four conductive elements 174, 176, 178, 180 which are generally parallel to each other and each of which has been energized by a wire 182, 184, 186 to create an electromagnet which provides a reference magnetic field. As the magnetic member 170, which in the form shown is a permanent magnet, moves with respect to conductors 174, 176, 178, 180 the magnetic flux will be altered thereby altering the current induced in wires 182, 184, 186 as well as the wire (not shown) around conductor 174. By monitoring the current in the wires one may obtain a precise reading of changes in induced current and thereby relate the same to the particular conductor and determine in a digital fashion (by means of an appropriate analog digital converter) the amount and direction of departure from the desired position or confirm the fact that the rotor is in the desired position. The electromagnetic sensor of FIG. 5 provides three dimensional spin position sensing (two angles and vertical position). Similarly, the upper sensor 172 cooperates with conductors 200, 202, 204, 206 which are associated wires 208, 210, 212 and a fourth wire (not shown).

It will be appreciated that while in FIGS. 1 and 5 reference has been made to rotor which has two sensors, in some installations one sensor may be used and the second sensor not employed.

Figure 6:
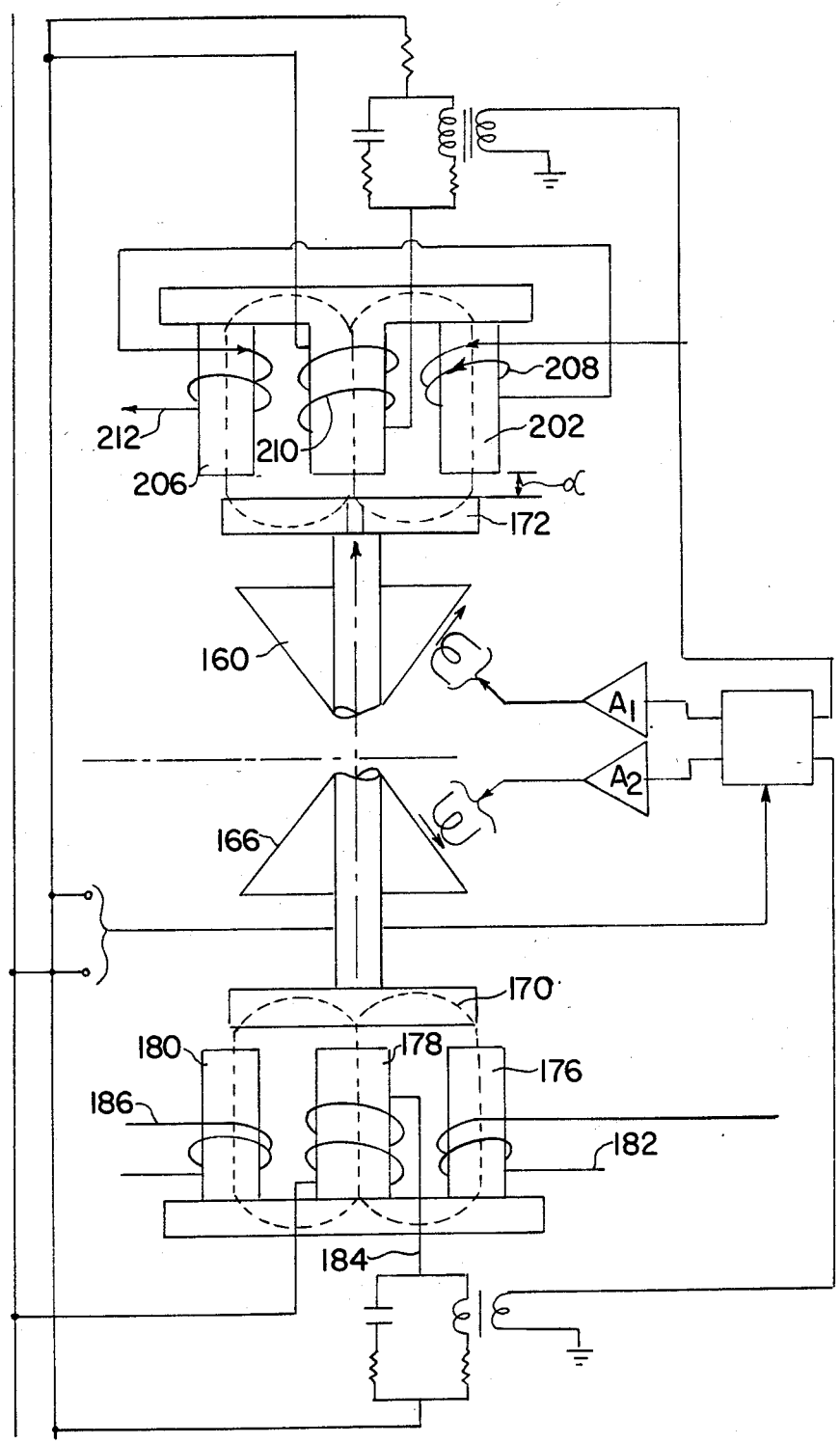
FIG. 6 is a schematic diagram showing a magnetic form of pickoff.

FIG. 6 shows a more detailed view of the magnetic pickoffs illustrated in FIG. 5, and a feedback system providing spin levitation force control as a function of deviation signals which are generated by the position sensors of FIG. 5 and are amplified by $A_1$ and $A_2$.

Figure 7:
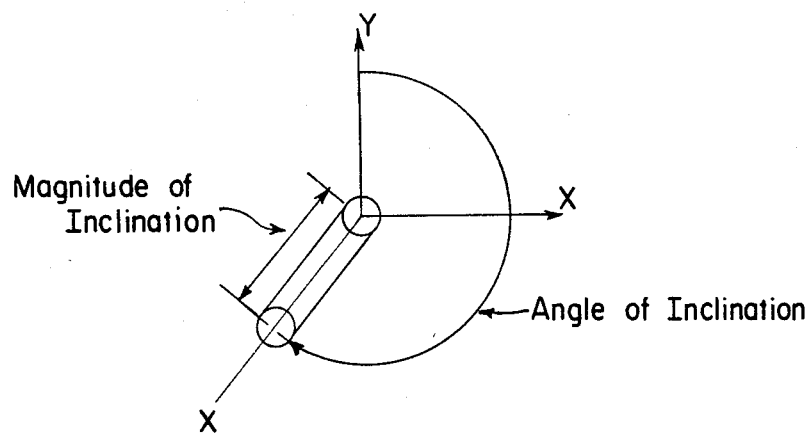
FIG. 7 is a diagram showing the reference axes.

Referring to FIG. 7, there is shown the X, Y, Z coordinate axes and the degrees of measurement referred to in determining the angle of inclination of the rotor as well as the magnitude of inclination of the same.

Figure 9:
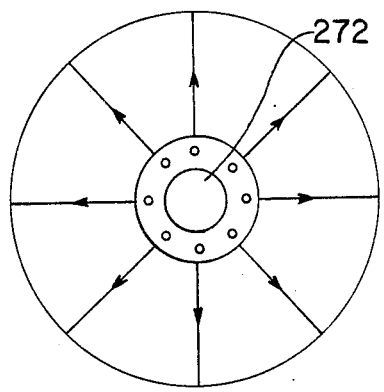
FIG. 9 is a top plan view of the pickoff of FIG. 8.
Figure 8:
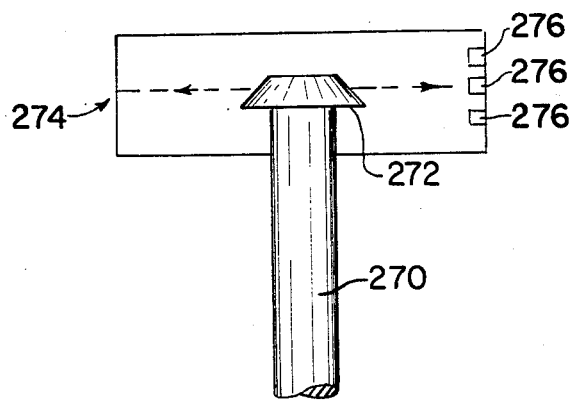
FIG. 8 is a schematic front elevational view of a form of optical pickoff of the present invention.

Referring to FIGS. 8 and 9 an optical pickoff of the present invention will be considered. The rotor 270 terminates in a reflector 272 which is disposed within a hollow cylinder 274. The lateral wall of the cylinder is provided with a plurality of light receivers 276 which are spaced vertically from each other as well as circumferentially with a view towards obtaining substantially complete coverage of the internal surface of the lateral cylinder wall. Light, represented by the arrows will impinge on the sloping surface of the conductor 272 and will be reflected onto the lateral cylinder wall. It will be appreciated that by determining which receivers 276 have been illuminated by the light which may be conventional in source or a laser source, for example, with a threshold for detection to provide a binary signal source, one could determine the precise position in respect of angular inclination and magnitude of inclination of the rotor 270.

Figure 10:
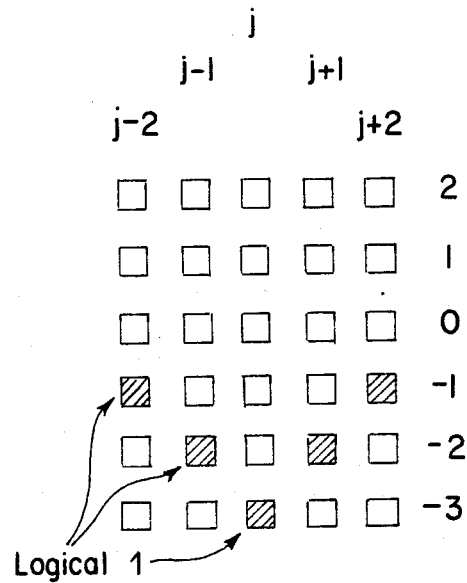
FIG. 10 is diagram illustrating digital aspects of the optical pickoff of the invention.

In the example shown in FIG. 10 the matrix is to indicate which receivers 276 within the j zone have received light and to convert the reading into a digital reading, thereby permitting conversion of the light received into a position related digital function. In this example a logical true condition of $(-2, j)$ indicates an inclination along the direction j with a strength of 2.

Figure 11:
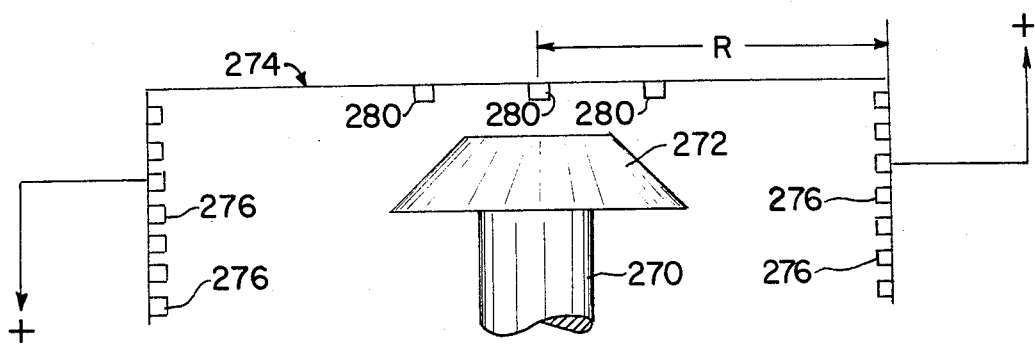
FIG. 11 is fragmentary view of the optical pickoff of the present invention.

FIG. 11 illustrates in combination the relationship between (a) the rotor 270 and reflector 272 with (b) the cylinder 274 and the lateral wall receivers 276. As is shown in this figure a series of light sources 280 are positioned on the upper wall in order to provide light which will impinge on the reflector 272.

Figure 12:
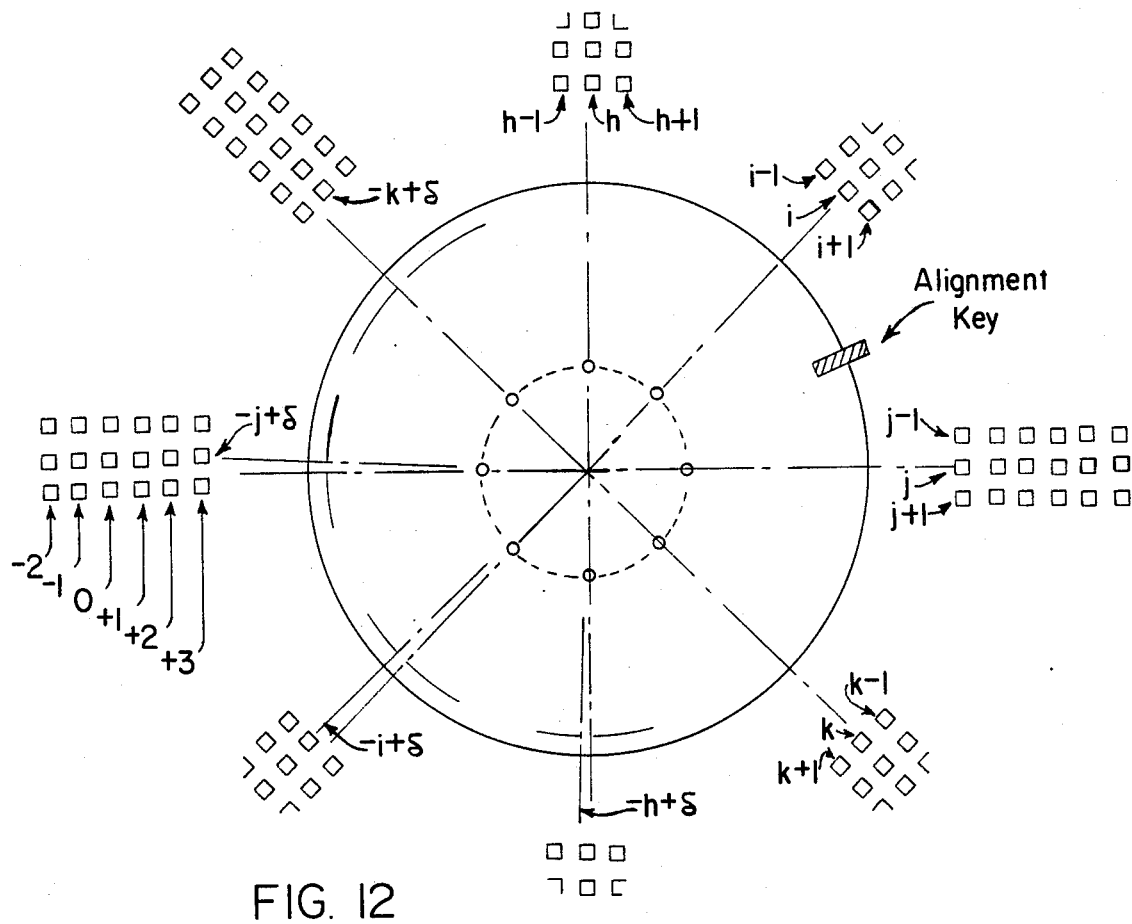
FIG. 12 is a schematic top plan view of the optical pickoff of the present invention.

FIG. 12 illustrates an array of light receivers 276 assigned different letters for indexing purposes and the use of an alignment key for indexing.

Figure 13:
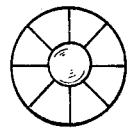
FIGS. 13 and 14 are, respectively, top plan and front elevational views of a modified form of reflector used in an optical pickoff used in the present invention.
Figure 14:
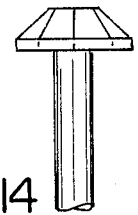

If desired, the reflector 272 rather than having a smooth tapered surface such as the frusto-conical configuration illustrated, may have a faceted surface with different reflective surfaces corresponding with different sensors in a predetermined fashion such as is shown in FIG. 13 and 14.

The location of the light sensors is such that straight forward combinational logic can be used to obtain the position (inclination) of the reflected light beam. One can also make possible the use of a microprocesssor to provide the digital response (output signal) according to a programmable strategy. While the combinational implementation provides speed and the microprocessor implementation provides programmable flexibility, both types of implementation can use state of the art microelectronic technology.

The use of the microprocessor also provides the means to perform digital filtering on the light measurements thus reducing noise by use of techniques such as averaging, Kalman filtering and the like.

It will be appreciated that the feedback control capability for stability can be enhanced through stochastic optimization.

It will be appreciated, therefore, that the present invention has provided an efficient, accurate and economical means for monitoring the position of a gyroscope rotor while employing a minimum amount of energy and generating relatively little heat. The system further provides pickoff means for communicating the position or departure from desired position in such fashion as to permit use of digital equipment in processing the information as well as employing the same as a servomechanism for initiating corrective action when a predetermined departure of the rotor position from a desired position has been noted.

While in the preferred emobodiments, two hemispherical portions will be provided, one such portion or more than two could be employed, if desired.

While in the preferred form the hemispheres are composed of electrically nonconductive material with conductive inserts, if desired the hemispheres may be composed of a conductive material.

Whereas particular embodiments of the invention have been described above for purposes of illustration, it will be evident to those skilled in the art that numerous variations of the details may be made without departing from the invention as defined in the appended claims.

We claim:

1. A suspension gyroscope comprising,
   a stator,
   a rotor rotatably mounted on said stator,
   means for initiating rotation and levitation of said rotor with respect to said stator,
   said rotor having at least one generally hemispherical portion at least parts of which are electrically conductive,
   first electrical coil means for generating magnetic fields to induce eddy currents in said hemispherical portions,
   said first electrical coil means having coils adapted to apply a levitation force in a first direction to a first said hemispherical portion,
   said rotor having disc means which are at least partially electrically conductive,
   second electrical coil means for inducing eddy currents in said disc means to control positioning of said rotor means in second and third directions, and
   sensor means for sensing departure of said rotor from a desired position with respect to said stator.

2. The gyroscope of claim 1 wherein
   said rotor has a pair of said hemispherical portions, and
   said first electrical coil means having coils adapted to apply a lifting force to a second said hemispherical portion to correct the position of said rotor in said levitated state in a first direction.

3. The gyroscope of claim 2 wherein said disc means includes a pair of relatively spaced disc portions, and
   said second electrical coil means have at least one coil operatively associated with each said disc portion.

4. The gyroscope of claim 2 wherein said hemispherical portions are composed of a nonmagnetic material having electrically conductive material secured thereto.

5. The gyroscope of claim 4 including electrically conductive material has a plurality of annular portions.

6. The gyroscope of claim 5 including said electrically conductive material being of a thickness of about 0.1 to 0.5 mm.

7. The gyroscope of claim 2 including said hemispherical portions having openings facing each other.

8. The gyroscope of claim 7 including said hemispherical portions disposed along the longitudinal axis of said rotor intermediate the axial positions of said disc means.

9. The gyroscope of claim 8 including trim means for adjusting the air gap between said rotor and said stator.

10. The gyroscope of claim 9 including said trim means having magnetic trim screws.

11. The gyroscope of claim 8 including said gyroscope having transducer means for facilitating initial positioning of said rotor in a predetermined position.

12. The gyroscope of claim 2 wherein said hemispherical portions have openings facing away from each other.

13. The gyroscope of claim 2 including motor means for initiating rotation and levitation of said rotor with respect to said stator.

14. The gyroscope of claim 13 including bearing means for rotatably supporting said rotor when said rotor is in a nonlevitated state.

15. The gyroscope of claim 14 including said stator means having a housing for enclosing at least a portion of said rotor.

16. The gyroscope of claim 13 including said sensor means having optical means.

17. The gyroscope of claim 16 including said sensor having speculum means mounted on said rotor and receiver means for receiving light reflected from said speculum means.

18. The gyroscope of claim 13 including said sensor means have magnetic means.

19. The gyroscope of claim 18 including said receiver means having a plurality of receiver elements spaced from said speculum means, whereby light impinging on said speculum will be reflected to receiver elements related to the position of said rotor.

20. The gyroscope of claim 18 including said magnetic sensor means having permanent magnet means operating with said coil means, whereby movement of said rotor out of its predetermined positon will alter the current induced in said coil means.

21. The gyroscope of claim 13 including said motor means having at least one stationary gyromotor for creating a magnetic field, and
   rotor sectors operatively associated with said motor means to cause said rotor to be elevated responsive to said motor means magnetic field.

22. The gyroscope of claim 21 including motor means including two said motors, and
   said rotor sectors include a pair of annular members disposed adjacent to said motors.

23. The gyroscope of claim 22 including third air gaps defined between said rotor section and said motors.

24. The gyroscope of claim 22 including said rotor sectors secured to said disc means.

25. The gyroscope of claim 1 wherein said sensor means are fixedly secured to said rotor.

26. The gyroscope of claim 1 including first air gaps defined between first element coil means and said hemispherical portions.

27. The gyroscope of claim 1 including second air gaps defined between second electrical coil means and said disc means.

* * * * *

UNITED STATES PATENT AND TRADEMARK OFFICE
CERTIFICATE OF CORRECTION

PATENT NO. : 4,610,172

DATED : September 9, 1986

INVENTOR(S) : YULY M. PULYER and MARLIN H. MICKLE

It is certified that error appears in the above-identified patent and that said Letters Patent is hereby corrected as shown below:

On the Title Page, the sequence of the inventors should be reversed to read: --Yuly M. Pulyer, Marlin H. Mickle--.

Under "References Cited", the fifth reference "Bert" should be --Bers--.

Under "References Cited", the last reference cited "Mindhara" should read --Minohara--.

Column 6, line 38, "FIG." should be --FIGS.--.

Column 7, line 1, "emobodiments" should be --embodiments--.

Claim 20, column 8, line 36, "positon" should be --position--.

Signed and Sealed this

Third Day of February, 1987

Attest:

DONALD J. QUIGG

Attesting Officer

Commissioner of Patents and Trademarks